Patented Oct. 27, 1925.

1,558,584

UNITED STATES PATENT OFFICE.

MAX BOCKMÜHL, GUSTAV EHRHART, AND PAUL FRITZSCHE, OF HOCHST-ON-THE-MAIN, GERMANY, ASSIGNORS TO FARBWERKE VORM. MEISTER LUCIUS & BRÜNING, OF HOCHST-ON-THE-MAIN, GERMANY, A CORPORATION OF GERMANY.

COMPLEX GOLD COMPOUND AND PROCESS OF MAKING SAME.

No Drawing.     Application filed November 29, 1924. Serial No. 752,937.

*To all whom it may concern:*

Be it known that we, MAX BOCKMÜHL, GUSTAV EHRHART, and PAUL FRITZSCHE, citizens of Germany, residing at Hochst-on-the-Main, Germany, have invented certain new and useful Improvements in Complex Gold Compounds and Processes of Making Same of which the following is a specification.

We have found that by causing gold salts to act upon compounds which are derived from thiourea, for instance upon heterocyclic compounds derived from thioreau, for instance thiobarbituric acid, furthermore acyclic compounds for instance thiohydantoinic acid, gold compounds are obtained in which the gold is combined in a complex manner with sulphur. In so far as the resulting compounds are not water soluble and possess an acid character which comprises also compounds of phenolic characters, they are converted into water-soluble compounds for instance in the form of their alkali metal salts. We have more especially found that by causing gold salts to act upon thiobenzimidazoles and thiobenzimidazole carboxylic acids gold compounds are obtained in which the gold is combined in a complex manner with sulphur.

The new compounds have proved to be very efficacious for destroying infectious germs and they are therefore intended to be used in chemotherapy.

*Examples:*

1. 6 g. of thiohydantoinic acid are dissolved in 225 cc. of water and 45 cc. of double normal caustic soda lye. The whole is filtered and mixed with diluted hydrochloric acid (10%) until the solution is complete. Thereupon 4.5 grams of potassium auribromide dissolved in 60 cc. of water are added and the precipitating complex gold compound is immediately filtered off by suction; the gold compound after being washed is suspended in 50 cc. of water and dissolved by adding double normal caustic soda solution. This solution is poured in ½ litre of alcohol, the precepitating sodium salt is filtered off and then washed with alcohol and ether.

2. To a solution of 1 part of thiobarbituric acid in 100 parts of methyl alcohol is added a solution of 1 part of potassium auribromide in 20 parts of methyl alcohol. There is first filtered off the small quantity of the by-product which may precipitate and then there is once more added in equal quantity of potassium auribromide. The precipitate resulting from the reaction is filtered off by suction, washed with methyl alcohol, in the moist state as it leaves the filter suspended in a small quantity of water and passed into solution by adding double normal caustic soda solution. The further operations are the same as those indicated in Example 1.

3. 3 grams of thiobenzimidazolecarboxylic acid are finely suspended in 70 cc. of water and then mixed with 400 cc. of acetic ester. There is then introduced in small portions a solution of 7.5 grams of potassium auribromide in 30 cc. of acetic ester and the whole is vigorously shaken. The addition of the single portions is each time delayed until the solution has become colorless. The aqueous layer, which contains hydrobromic acid and potassium bromide, is isolated and the acetic-ester-solution is reduced in vacuo to dryness. In order to transform the gold compound of the thiobenzimidazolecarboxylic acid into its sodium salts, it is dissolved in the calculated quantity of sodium hydroxid solution and precipitated with alcohol. Thus, a green-yellowish powder is obtained which dissolves very readily in water.

The thiobenzimidazolecarboxylic acid used as parent material may, for instance, be prepared as follows:

188 parts of the hydrochloride of diaminobenzoic acid are mixed with 1,000 parts of alcohol, 113 parts of caustic potash and 128 parts of potassium xanthogenate and the whole is boiled on the steam bath under reflux until the evolution of sulphuretted hydrogen, which at the beginning sets in vehemently, has ceased. The precipitated potassium salt is filtered off, the salt is dissolved in water, filtered and the thiobenzimidazolecarboxylic acid is precipitated by adding sulphuric acid or acetic acid. The acid precipitates in the form of white, voluminous flakes which are filtered off by suction. The thiobenzimidazolecarboxylic acid is insoluble in the usual organic solvents and soluble with great difficulty in hot water.

We claim:

1. The process for preparing complex gold compounds which consists in causing gold salts to act upon compounds containing a thiourea residue and converting the gold compounds thus obtained, so far as they are of an acid character, into their salts.

2. The modification of the process referred to in claim 1 which consists in causing gold salts to act upon thiobenzimidazolecarboxylic acids and converting the gold compounds thus obtained into their salts.

3. As new products, the bodies obtainable by causing gold salts to act upon compounds containing a thiourea residue, and converting the resulting gold compounds, so far as they are of an acid character, into their salts, said bodies being slightly colored to yellowish-green, solid substances, which, so far as they are salts, readily dissolve in water with neutral reaction.

4. As new products, the bodies obtainable by causing gold salts to act upon thiobenzimidazolecarboxylic acids and converting the gold compounds thus obtained into their salts, the said bodies being yellowish powders, soluble in water.

In testimony whereof, we affix our signatures.

MAX BOCKMÜHL, Ph. D.
GUSTAV EHRHART, Ph. D.
PAUL FRITZSCHE, Ph. D.